June 6, 1939.  L. L. WEAVER  2,161,494
STRAND HANDLING APPARATUS
Filed Jan. 8, 1938   2 Sheets-Sheet 1
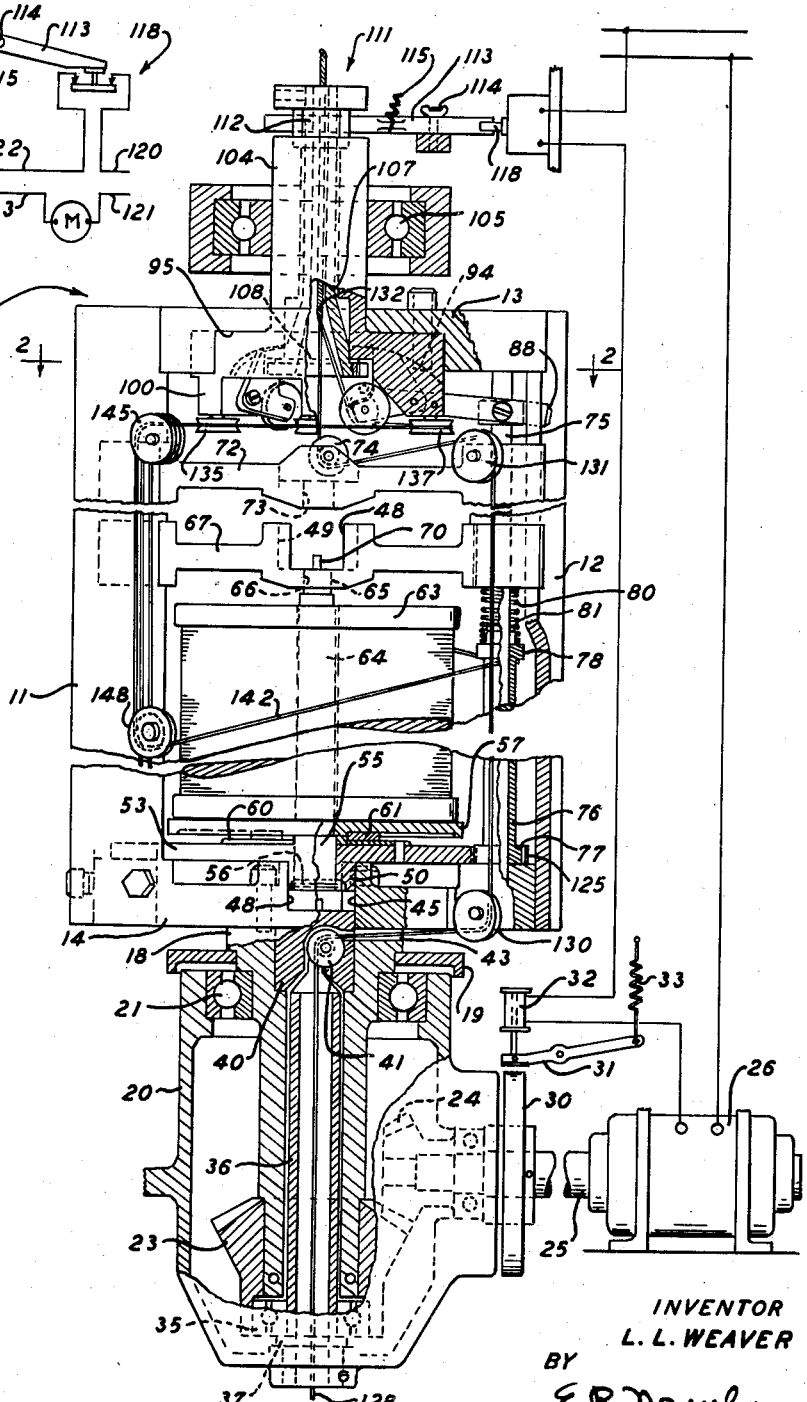
INVENTOR
L. L. WEAVER
BY
E. R. Nowlan
ATTORNEY June 6, 1939.  L. L. WEAVER  2,161,494
STRAND HANDLING APPARATUS
Filed Jan. 8, 1938  2 Sheets-Sheet 2
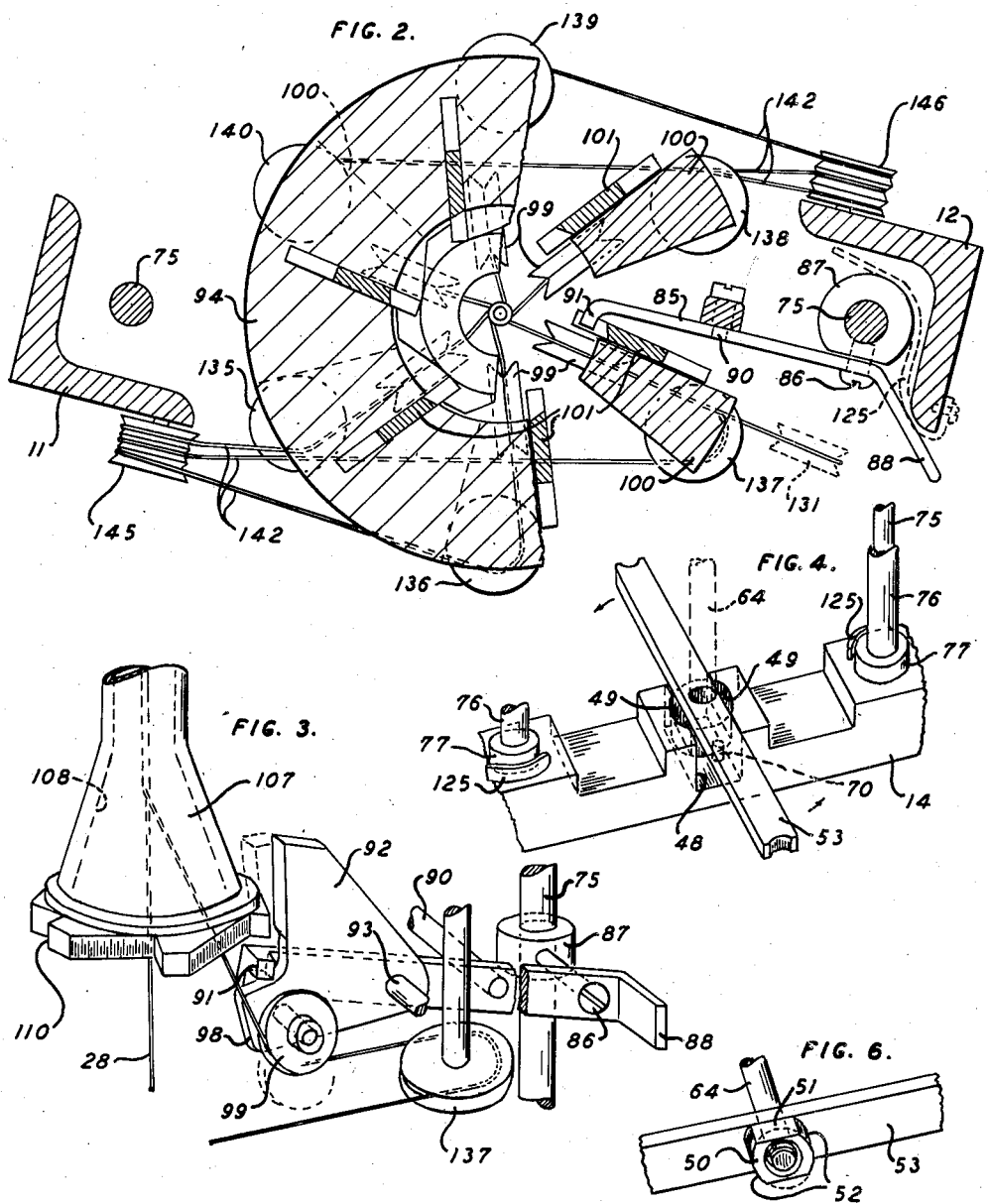
INVENTOR
L. L. WEAVER
BY
E. R. Nowlan
ATTORNEY Patented June 6, 1939

2,161,494

UNITED STATES PATENT OFFICE 2,161,494

STRAND HANDLING APPARATUS

Leo L. Weaver, Cranford, N. J., assignor to Western Electric Company, Incorporated, New York, N. Y., a corporation of New York Application January 8, 1938, Serial No. 183,945

23 Claims. (Cl. 57—58)

This invention relates to a strand handling apparatus and more particularly to an apparatus for intertwisting strands over a core.

Objects of the invention are to provide a spool lock and stop control for a strand handling apparatus.

With these and other objects in view the invention contemplates a rotary unit supporting in vertical alignment a plurality of strand supply reels removably locked in place by elements associated with a lever to secure the unit against rotation when it is desirable to remove one or more of the reels, the lever also responding to a loose or broken strand to stop the unit.

Other objects and advantages will be apparent from the following detailed description taken in conjunction with the accompanying drawings, wherein Fig. 1 is a fragmentary front elevational view of the apparatus, portions thereof being shown in section;

Fig. 2 is an enlarged fragmentary sectional view taken substantially along the line 2—2 of Fig. 1;

Fig. 3 is an enlarged fragmentary perspective view illustrating a portion of the control mechanism;

Fig. 4 is an enlarged fragmentary perspective view illustrating a reel supporting mechanism;

Fig. 5 is a wiring diagram illustrating the control circuit, and

Fig. 6 is a fragmentary perspective view of a reel supporting element.

Referring now to the drawings, numeral 10 indicates generally a rotary unit composed of spaced vertically extending angle members 11 and 12 secured at their upper ends to a head member 13 and at their lower ends to a base member 14. Affixed to the base member 14 and projecting downwardly therefrom is a hollow shaft 18 reduced at one portion to support a disk-like cover 19 for a housing 20 and reduced at another portion for receiving a roller bearing 21, the latter being disposed in the upper portion of the housing 20 and serving to rotatably support the hollow shaft 18. Mounted upon the lower end of the hollow shaft and disposed in the housing 20 is a bevelled gear 23 which intermeshes with a bevelled gear 24 of a shaft 25 rotated by a motor 26 when energized. A brake drum or wheel 30 is fixedly mounted upon the shaft 25 and has associated therewith a brake lever 31 held away from the brake drum by a solenoid 32 when energized but urged into intimate engagement with the brake drum by a tension spring 33 when the solenoid is deenergized.

The lower portion of the bevelled gear 23 houses a bearing 35 which is disposed concentric with a tubular member 36, the latter extending freely into the hollow shaft 18 and having its lower end secured in an aperture in the housing 20. The bearing 35 rests upon a collar 37 of the tubular member 36 and with the bearing 21 rotatably supports the hollow shaft.

In a centrally bored aperture in the upper end of the hollow shaft 18 is disposed a block 40 rotatably supported therein a sheave 41 and grooved to provide a passageway 42 communicating at its lower end with the tubular member 36, extending around the sheave 41 and outwardly in a horizontal plane where it communicates with an aperture 43. The aperture 43 is formed by cutting a groove in the upper edge of the hollow shaft 18. The block 40 projects upwardly into an aperture 45 to aid in aligning the base member 14 with the shaft 18 during assembly and to assist in forming a more positive connection between these members.

The ends and center portion of the base member 14 have their upper surfaces in a common plane, the center portion being indicated at 48 has a groove 49 cut therein at right angles to the longitudinal center line of the base member, the side walls of this groove being arcuate shaped at their centers as indicated at 49 (Fig. 4). In the groove 48 a retaining lug 50 is removably disposed, this lug having flat side walls 51 slidably receivable in the groove 48 and arcuate end walls 52 similar in general contour to the arcuate walls 49 and arranged to be moved into registration therewith. The lug 50 is secured to or formed integral with a locking bar 53. The vertical dimension of the lug 50 is less than the depth of the groove 48 so that by rotating the locking bar 53 for one half a revolution to align a bar with the groove 48 as shown in Fig. 4, the bar with the lug may drop downwardly until the lug rests upon the bottom of the groove. Extending vertically through an aperture in the lug 50 is a spindle 55 arranged to rotate therein but held against displacement in one direction by a retaining spring 56, disposed in the lower end of the spindle, and in the opposite direction by a reel supporting disk 57 fixedly mounted upon the spindle. Beneath the reel supporting disk 57 and rigidly mounted upon the locking bar 53 is a stationary disk 60 supporting a friction washer 61, the latter providing a stationary friction support for the disk 57. The spindle 55, for removably receiving a supply reel 63, carries a leaf spring 64 positioned to engage the inner peripheral wall of the hub of the reel to hold the reel against displacement and has its upper end reduced as at 65 so as to be removably disposed in an aperture 66 of a cross member 67.

The rotary unit 10 may be constructed to support any desired number of supply reels 63, in the present instance there being six, the lowermost reel being supported by the base member 15, and a cross member 67 is provided for each of the other reels to position them in vertical alignment between the angle members 11 and 12. The cross members 67 have their outer ends fixed to the angle members with their center portions being provided with grooves 48 with arcuate shaped wall portions 49, the same as previously described for the base member 14. In each of these grooves 48 are disposed stop pins 70 for a purpose hereinafter described. Another cross member 72, extending between the angle members 11 and 12 with its ends secured thereto, is positioned above the uppermost cross member 67 and has an aperture 73 in the center thereof, and in alignment with similar apertures in the cross members 67, for removably receiving the reduced end 65 of the spindle 55. In this cross member is rotatably mounted a sheave 74. Vertically movable rods 75 in the hollow portions of the angle members 11 and 12 extend vertically through apertures in the ends of the cross members 67 and 72 and have their ends movably disposed in apertures in the head member 13 and base member 14. Slidably disposed upon the rods 75 between the cross members 67 and 72 are sleeves 76 (Fig. 1) having enlarged circular portions 77 at the bases thereof and enlarged circular portions 78 adjacent the upper ends thereof. In Fig. 1 one of the sleeves 76 is shown with the circular portion 77 resting upon the base member 14 and urged downwardly by a helical compression spring 80 disposed concentric with the rod 75 and positioned between the enlarged circular portion 78 and the lower surface of the cross member 67 positioned thereabove. A pin 81 extends through the rod 75 immediately above each sleeve 76 so that vertical movement of one of the sleeves moves in unison therewith the rod. A sleeve 76 is disposed concentric with each rod 75 adjacent the base member 14 and upon each cross member 67 providing two sleeves for each reel positioned. Means is provided for moving the rod 75 relative to the sleeves 76. This means consists of levers 85 operatively connected at 86 to collars 87, fixed upon the rods, and having outwardly projecting handle portions 88. The levers 85 are pivoted at 90 and extend inwardly toward the axis of the rotary unit 10 where portions 91 are bent at right angles to engage latches 92 as illustrated in Fig. 3. The latches 92, of the general contour shown in Figs. 1 and 3, are pivoted at 93 upon radial projections 100 of a latch supporting element 94 circular in general contour and secured in a recessed portion 95 of the head member 13. Inwardly projecting legs 98 of the latches 92 carry stub shafts for rotatably supporting sheaves 99. Some of the projections 100 pivotally support other latches 101 which are identical in construction with the latches 92 and have sheaves 99 rotatably mounted upon inwardly projecting leg portions 98 thereof.

The latch supporting element 94 has a hollow cylindrical journal 104 extending vertically through the head member 13 and rotatably disposed in a bearing 105. In the hollow portion of the journal 104 is disposed a switch controlling element 107 having a passageway 108 therethrough, the passageway being conical in shape adjacent the lower end thereof. At the lower end of the switch control 107 are latch engaging teeth 110 positioned to be engaged by the latches 92 and 101. The upper end of the switch controlling element 107 extends through the journal 104 and has a collar 111 mounted thereon with its lower surface resting in an annular groove in the journal 104. Opposite side walls 112 of the collar 111 are flattened while the portions between the flat walls are arcuate shaped. A switch actuating lever 113 pivotally mounted at 114 is normally urged into close engagement with one of the walls 112 of the collar by means of a spring 115 to hold the collar and the switch actuating element 107 against rotation unless the element is operatively connected to the rotary unit 10 through one of the latches 92 or 101. The end of the lever 113 farthest from the collar 111 is positioned to engage a switch 118 for moving the switch into open position when the collar is rotated due to the operative engagement of the element 107 with the rotary unit 10. The switch 118 is shown in the wiring diagram (Fig. 5) in one side of a circuit, represented by conductors 120 and 121, for supplying electrical energy to the solenoid 32 and motor 26 when closed. The conductor 120 leads to the switch 118 and from the switch a conductor 122 leads to the solenoid 32. From the solenoid 32 a conductor 123 leads to one terminal of the motor 26, the other terminal of the motor being electrically connected to the conductor 121. The switch 118 is shown in both Figs. 1 and 5 in closed position, thus completing a circuit from 120 through the switch, the solenoid and the motor, causing the solenoid to be energized, holding the brake lever 31 out of engagement with the brake wheel 30 against the tension of the spring 33 when the motor is energized to operate the apparatus. Should the collar 111 be rotated, the lever 113 will be moved about its pivot, moving the switch 118 into open position, breaking the circuit for deenergizing the solenoid and the motor, allowing the spring 33 to move the brake lever 31 into engagement with the brake wheel 30 to stop the rotation of the apparatus.

Although Fig. 1 is broken and only illustrates one supply reel 63 it is to be understood that in this embodiment of the invention six supply reels 63 may be disposed in the rotary unit 10. It is possible, of course, to construct the apparatus to support any desired number of supply reels. These reels are each mounted upon a spindle 55 carried by a locking bar 53 supplied with a disk 60, a friction ring or washer 61 and a reel supporting disk 57. Each reel unit is removably inserted in its respective position, the lowermost reel unit being supported by the base member 14 while the other reel units are supported by the cross members 67. At each reel positioned there are two locking sleeves 76 positioned one upon each side upon the rod 75. The outer ends of each locking bar 53 are concaved in general contour to conform to the periphery of their respective collars 77 of the sleeves 76. Therefore, when the locking bars are in locked positions their ends engage the collars 77, to hold the bars against rotation and the arcuate walls 52 of the lugs 50 are in engagement with the arcuate walls 49 to hold the bars against lateral movement. To remove one of the reels the levers 85 are actuated to move the bars 75 upwardly, moving the pins 81 away from the sleeves 76 so that the selected sleeves for the reel which is to be removed may be manually moved upwardly, moving the collars 77 free of the ends of the selected locking bar 53. When this has been done, springs 125, which have one of their ends fixed to their respective vertical members 11 and 12 and extend partially around the collars 77, move beneath the collars, to hold the sleeve in raised position, and urge the locking bar 53 out of registration with the collar. The locking bar is then free to be rotated until the flat walls 51 of the lug 50 are aligned with the straight side walls of the groove 48 at which position the bar with its lug may drop into the groove a sufficient distance to cause the upper portion 65 of the spindle 55 to be removed from its aperture 66 and allow the reel unit to be removed from the apparatus.

A core 128 which is to be covered is threaded upwardly through the tubular member 36 around the sheave 41 through the aperture 43 around a sheave 130 rotatably supported by the base member 14 upwardly to and around a sheave 131 rotatably supported by the upper cross member 72, over to and around the sheave 74 and upwardly through the hollow switch controlling element 107. The strands from the six supply reels are fed to a point 132 where they are wound around the core 128 during advancement of the latter. In Fig. 2 it will be observed that the sheaves 99 supported by the latches 92 and 101 extend radially from the axis of the advancing core 128. Rotatably mounted upon the undersurfaces of the radially extending lugs 109 are sheaves 135 to 140 inclusive, for receiving covering strands 142 from the reels 63. Groups of sheaves 145 and 146 are rotatably mounted on the vertical members 11 and 12 respectively, so that strands 142 from three of the supply reels may be fed upwardly along one side of the rotary unit and strands from the other three supply reels may be fed upwardly along the other side of the unit. Referring now to Figs. 1 and 2 it will be observed that the strand 142 from the supply reel shown is fed from the reel around one of the sleeves 76 over to and around a sheave 148 where the strand is directed upwardly to the center sheave in the group 145. From this sheave it is directed to the sheave 137 around which it passes to its associated sheave 99 to the point 132 where it is wrapped around the advancing core. The strands from the other reels are threaded in a similar manner to their respective sheaves 135, 136, 138, 139 and 140 from where they are directed over their respective sheaves 99 to the wrapping point 132.

The operation of the apparatus is as follows: When the supply reels 63 are locked in place, their respective strands threaded to the twisting point 132 and suitably twisted upon the core 128 which has been threaded through the apparatus, the apparatus may be set for operation by the manual closing of the switch 118, moving it into position adjacent the lever 113. The lever 113 will hold the control element 107 against rotation due to its engagement with one of the flat walls 112 by the aid of the spring 115. During the operation of the apparatus the covered core may be advanced by any suitable means such as a power driven take-up reel (not shown) and while the core is advanced the strands 142 will be continuously and uniformly applied thereto. If one of the strands 142 should break or become loose, as in the case when a reel is emptied, the sheave 99 around which the loosened or broken strand has been passing and which, during the operation of the apparatus has been held upwardly by the strand to hold its respective latch 92 or 101 away from the teeth 110 of the stationary control unit 107, will allow its latch to move downwardly about its pivot to a position where it will engage with one of the teeth 110, operatively connecting the element 107 with the rotary unit 10 and causing a unitary rotation thereof. Rotation of the element 107 will immediately move the lever 113, against the force of the spring 115, about its pivot actuating the switch 118 to break the circuit to the solenoid 32 and motor 26 deenergizing these electrical units, allowing the spring 33 to move the lever 31 into engagement with the brake drum 30 to stop the rotation of the unit 10. When the apparatus is at rest the rods 75 may be raised as hereinbefore described to remove the empty reel. When all the rods 75 are in their raised positions the latches 92 associated therewith are held in engagement with the element 107, through its teeth 110, to safeguard the operator, while reconditioning the apparatus for operation, by making it impossible to operate the apparatus through the actuation of the switch 118.

When the apparatus is at rest the broken strand may be mended or the empty reel may be removed and a full reel inserted in its place, the strand of the full reel being threaded over the proper sheaves and secured in any well known manner to the strand of the previous reel. It is not necessary to raise the rods 75 in order to mend a broken strand but by raising either one or both the rods, they serve as a safety means by locking the rotary unit 10 against operation.

However, to replace an empty reel with a full one the rods 75 must be raised in order to move the sleeves 76, adjacent the empty reel, to move the collars 77 thereof free of the bar 53. The bar with the empty reel may be rotated until it is aligned with the groove 48 and when in this position it will drop into the groove until the lug 50 engages the bottom wall thereof. The downward movement of the bar is sufficient to free the upper end of the spindle 55 and the reel unit may then be removed. After the empty reel has been replaced by a full reel the reel unit may be inserted in place in the rotary unit in just the reverse order.

The embodiments of the invention herein disclosed are illustrative only and may be widely modified and departed from in many ways without departing from the spirit and scope of the invention as pointed out in and limited only by the appended claims.

What is claimed is:

1. In a strand handling apparatus, a rotary unit, means for rotating the unit, a reel support rotatably disposed in the unit, means for locking the reel support in the unit, and means rendered effective by the movement of the locking means to unlock the reel support for rendering ineffective the rotating means.

2. In a strand handling apparatus, a rotary unit, means for rotating the unit, a plurality of reel supports removably disposed in the unit, means for locking the reel supports in the unit, and means rendered effective by the movement of one of the locking means to unlock one of the reel supports for rendering ineffective the rotating means.

3. In a strand handling apparatus, a rotary unit, means for rotating the unit, a reel support rotatably disposed in the unit, means for locking the reel support in the unit, means rendered effective by the movement of the locking means to unlock the reel support for rendering ineffective the rotating means, and means for holding the locking means in unlocked position.

4. In a strand handling apparatus, a rotary unit, means for rotating the unit, a reel support rotatably disposed in the unit, means for locking the reel support in the unit, means rendered effective by the movement of the locking means to unlock the reel support for rendering ineffective the rotating means, means for holding the locking means in unlocked position, and means for moving the reel support out of locked position.

5. In a strand handling apparatus, a rotary unit, means for rotating the unit, a reel support rotatably disposed in the unit, means for locking the reel support in the unit, means rendered effective by the movement of the locking means to unlock the reel support for rendering effective the rotating means, and means for holding the locking means in unlocked position, the reel support being movable into engagement with the holding means for rendering the holding means ineffective.

6. In a strand handling apparatus, a normally stationary hollow element, a rotary unit rotatable about the element, means carried by the unit for directing strands through the element, means for rotating the unit, means associated with the directing means to cause the element to rotate should one of the strands break, and means actuated by the rotation of the element to render the rotating means ineffective.

7. In a strand handling apparatus, a normally stationary hollow element, a rotary unit rotatable about the element, means carried by the unit for directing strands having a predetermined tension through the element, means for rotating the unit, means associated with the directing means to cause the element to rotate should the tension of one of the strands vary, means actuated by the rotation of the element to render the rotating means ineffective, and means for locking the element to the unit.

8. In a strand handling apparatus, a rotary unit for applying strands to an advancing core, means for rotating the unit, an element carried by said unit, means normally holding the element against rotation with the unit, means rendered effective by the breaking of one of the strands for causing rotation of the element, rotation of the element causing movement of the holding means, and means responsive to the movement of the holding means for rendering the rotating means ineffective.

9. In a strand handling apparatus, a rotary unit having a grooved member, a reel spindle, a reel support secured to the spindle and having a projection receivable in the groove of the member to secure the support to the member.

10. In a strand handling apparatus, a rotary unit having a grooved member, a reel spindle, a reel support secured to the spindle and having a projection receivable in the groove of the member to secure the support to the member, the association of the portion of the element and the groove being such that rotative relative movement of the element will cause an interlocking relation between the element and the member.

11. In a strand handling apparatus, a rotary unit having an apertured member and a grooved member, a reel spindle having one end receivable in the aperture of the apertured member, a reel supporting element secured to the spindle and having a projection receivable in the grooved member, and means for limiting lateral movement of the spindle and the element relative to the member to align the spindle with the aperture.

12. In a strand handling apparatus, a rotary unit having an apertured member and a grooved member, a reel spindle having one end receivable in the aperture of the apertured member, a reel supporting element secured to the spindle and having a projection receivable in the grooved member, and means for limiting movement of the spindle and the element in one direction relative to the member to align the spindle with the aperture, movement of the spindle and element in another direction causing the spindle to enter the aperture and rotative movement of the element causing an interlocking relation between the element and the grooved member.

13. In a strand handling apparatus, a rotary unit having an apertured member and a grooved member, a reel spindle having one end receivable in the aperture of the apertured member, a reel supporting element secured to the spindle and having a projection receivable in the grooved member, means for limiting lateral movement of the spindle and the element relative to the member to align the spindle with the aperture, vertical movement of the spindle and element causing the spindle to enter the aperture and rotative movement of the element causing an interlocking relation between the element and the grooved member, and means for holding the element in the locked position against rotation.

14. In a strand handling apparatus, a plurality of spindles, supporting elements for the spindles, and a plurality of spaced parallel members conditioned to receive in interlocking association between successive pairs thereof one of the elements and spindles.

15. In a strand handling apparatus, a plurality of spindles, supporting elements for the spindles, a plurality of spaced parallel members conditioned to receive in interengaging association between successive pairs thereof one of the elements and spindles, and means carried by the members for securing the elements against displacement.

16. In a strand handling apparatus, a rotary unit having a plurality of spaced members apertured to receive the ends of spindles, reel supporting spindles receivable in the apertures of successive pairs of the members, radially projecting elements carried by the spindles, and latches movably disposed between the members for securing the elements against displacement.

17. In a strand handling apparatus, a rotary unit having a plurality of spaced members apertured to receive the ends of spindles, reel supporting spindles receivable in the apertures of successive pairs of the members, radially projecting elements carried by the spindles, a rod disposed in apertures in the members, and spring pressed sleeves movable on the rod between the members to hold the elements against displacement.

18. In a strand handling apparatus, a rotary unit having a plurality of spaced members apertured to receive the ends of spindles, reel supporting spindles receivable in the apertures of successive pairs of the members, radially projecting elements carried by the spindles, a rod disposed in the apertures in the members, spring pressed sleeves movable on the rod between the members to hold the elements against displacement, means for rotating the unit, said rod being movable relative to the members, and means controlled by the movement of the rod for rendering ineffective the rotating means.

19. In a strand handling apparatus, supporting elements for strand supply reels, a rotary unit having means for removably supporting the elements in general alignment, means for rotating the unit, means for directing an advancing core, means for directing strands from the reels to the advancing core, means actuated when one of the strands runs out for rendering ineffective the rotating means, means for holding the elements against displacement, and means actuated by the movement of one of the holding means to free an element for the removal of one of the reels for locking the said actuated means.

20. In a strand handling apparatus, a normally stationary element, a rotary unit, means to rotate the unit, means to direct a strand relative to the unit, means associated with the directing means to connect the element for rotation with the unit, and means actuated by the rotation of the element to render the rotating means ineffective.

21. In a strand handling apparatus, a normally stationary element, a rotary unit, means to rotate the unit, a member for directing a strand relative to the unit mounted for rotation with the unit and for movement into engagement with the element to cause rotation of the element with the unit, the member being movable free of the element by the strand, and means actuated by the rotation of the element to render the rotating means ineffective.

22. In a strand handling apparatus, a plurality of spindles, means to support the spindles in general alignment for the selective removal thereof including supporting elements for the spindles, and a plurality of spaced parallel members conditioned to removably receive the elements and spindles in interlocking association between successive pairs thereof.

23. In a strand handling apparatus, a plurality of spindles, means to support the spindles in general alignment for the selective removal thereof including supporting elements for the spindles, a plurality of spaced parallel members conditioned to removably receive the elements and spindles in interlocking association between successive pairs thereof, and means to secure the elements against removal movable to condition the elements and their spindles for removal.

LEO L. WEAVER.